Patented Feb. 2, 1926.

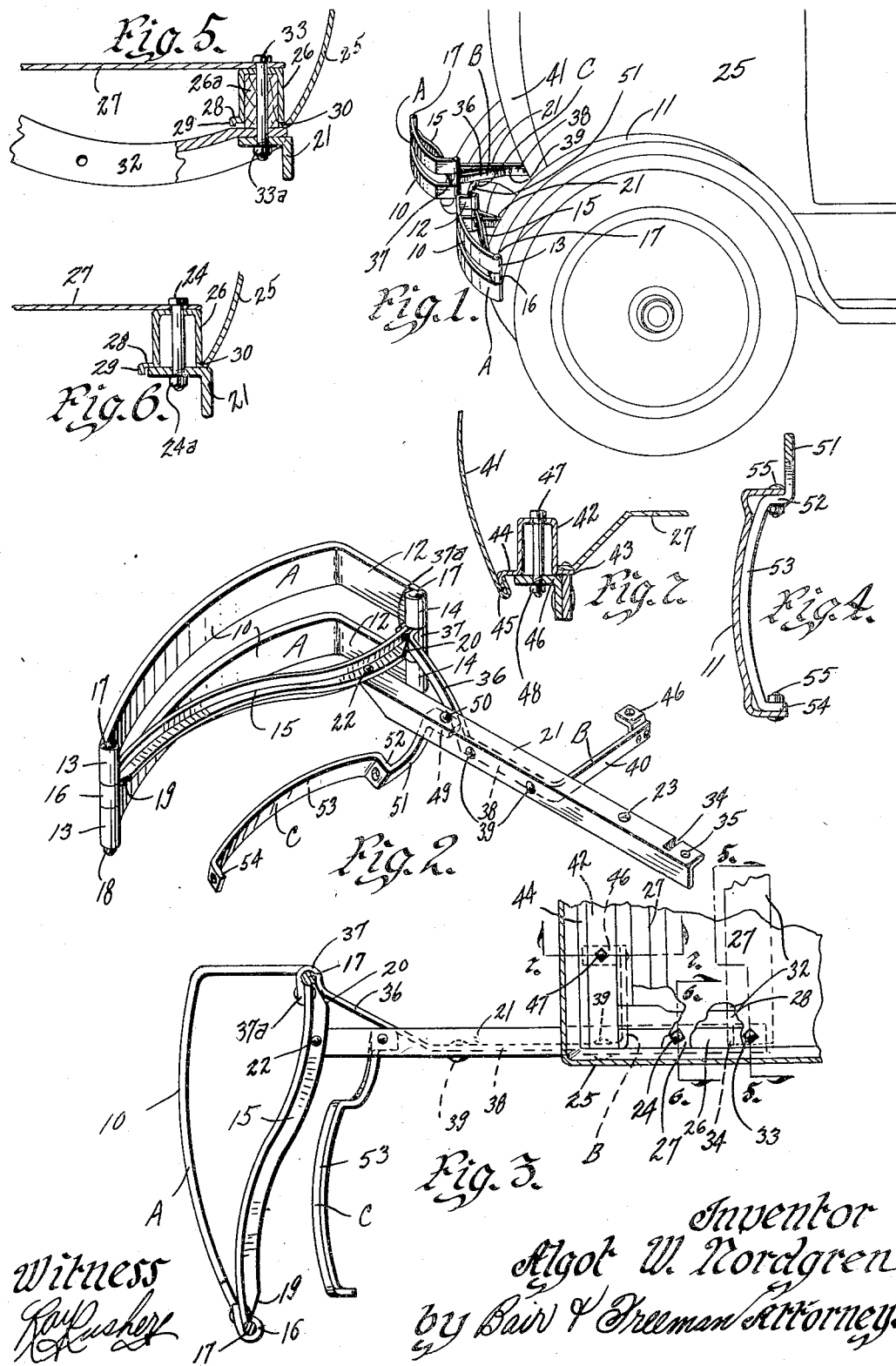

1,571,884

UNITED STATES PATENT OFFICE.

ALGOT W. NORDGREN, OF ST. PAUL, MINNESOTA, ASSIGNOR TO MARQUETTE MANUFACTURING COMPANY, OF ST. PAUL, MINNESOTA.

BUMPER.

Application filed October 26, 1925. Serial No. 64,912.

*To all whom it may concern:*

Be it known that I, ALGOT W. NORDGREN, a citizen of the United States, and a resident of St. Paul, in the county of Ramsey and State of Minnesota, have invented a certain new and useful Bumper, of which the following is a specification.

My invention relates to bumpers for use on motor vehicles.

My improved bumper structure may be used at either end of an automobile but is particularly designed for use for a rear bumper.

It is well-known that it has become a common custom to carry a spare tire at the back of an automobile, and it is desirable that a bumper structure should be provided which will not interfere with the carrying and with the quick removal or replacement of the spare tire.

It is therefore my purpose to provide a bumper structure of simple, durable and inexpensive construction which can be mounted on an automobile body as an attachment and which is composed of two separate and distinct bumpers spaced apart to allow room for the spare tire.

Furthermore, it is my object to provide such a pair of bumper devices having means for mounting the bumper elements on the body of a car for holding them rigidly against shocks imposed directly from the rear, from above, or below, or laterally.

Still a further purpose is to provide such a bumper structure having means for supporting and bracing the fenders.

It is likewise my purpose to provide such a bumper structure having two units so constructed and arranged that they may be made from a minimum of material and will occupy a minimum of space during storage or transportation, which structures, however, may be shipped assembled as units and ready for installation on the car.

It is also my purpose to provide such a pair of bumper units, each comprising vertically spaced spring bumper members, a rigid element for connecting said members, and means for supporting the bumper elements on the body of a car by a rigid connection which would prevent twisting and will withstand all the shocks to which the bumpers may be subjected.

It is therefore my purpose to provide in such a structure a novel means for rigidly mounting the bumpers on the car body.

With these and other objects in view, my invention consists in the construction, arrangement and combination of the various parts of my bumper, whereby the objects contemplated are attained, as hereinafter more fully set forth, pointed out in my claims, and illustrated in the accompanying drawings, in which:

Figure 1 is a perspective view of a portion of a motor vehicle equipped with a bumper device embodying my invention.

Figure 2 is a perspective view of one of my improved bumper units.

Figure 3 is a top or plan view of one of the bumper units installed on the car body, the body being shown partly in section and with parts broken away.

Figure 4 is a horizontal, sectional view of the rear end of a fender showing the fender brace member of the bumper unit attached thereto.

Figure 5 is a detail, sectional view taken on the line 5—5 of Figure 3.

Figure 6 is a similar view taken on the line 6—6 of Figure 3; and

Figure 7 is a detail, sectional view taken on the line 7—7 of Figure 3.

My improved bumper comprises a pair of bumper units made to be mounted on the right and left-hand sides of a motor vehicle at one end, and preferably at the rear thereof.

These units are alike with the exception of the necessary differences arising from the fact that they are made in rights and lefts and a description of one of them will therefore suffice for an understanding of both of them.

I will describe the right-hand unit as the bumper structure is installed on the rear of an automobile and will describe the parts in their positions when assembled as a unit and installed on the car.

Each bumper unit has a pair of spring steel bumper members proper indicated in the accompanying drawings generally by the reference character A.

Each bumper member A consists of a curved portion indicated by the reference numeral 10 adapted to stand just back of the rear end of the fender 11 and to project laterally a little beyond both sides of the fender with its concave face toward the fender.

At the inner end of each portion 10, the bumper member A is curved forwardly to form a forwardly extending portion 12.

The bumper members A are arranged in vertical spaced position with relation to each other.

Each of the portions 10 has at its outer end, an eye 13, the respective eyes 13 being in vertical alignment.

Each of the portions 12 has at its forward end an eye 14, the eyes 14 being in vertical alignment.

A rigid T-iron 15 is bent to form a reverse curve and is designed to connect the ends of the bumper members A. The T-iron member 15 has at its outer end an eye 16 in alignment respectively with the eyes 13 and having its other end between and adjacent to the eyes 14.

A bolt 17 is extended through the eyes 13 and the eye 16, as shown at the outer end of the bumper unit and has the nut 18 thereon. A similar bolt 17 is extended through the eyes 14 at the inner end of the bumper unit.

The inner end of the member 15 stands adjacent to the inner bolt 17 and is secured thereto in the manner hereinafter explained.

The horizontal flange of the member 15 is beveled as shown at 19 and 20 in Figure 3.

The bumper structure above described is attached to the car body in the following manner:

An angle iron support 21 has its rearward end bolted or riveted as at 22 to the horizontal flange of the T-iron member 15. The support 21 extends forwardly beneath the body of the car. Near its forward end, the member 21 is provided in its upper horizontal flange with spaced holes 23 and 35.

Near the forward hole 35, the support 21 is provided in its upper horizontal flange with a slot 34.

My improved bumper may be installed on different cars, but is described as installed on the Ford.

The Ford car has the longitudinally arranged side channel bar frame member 26 comprising a downwardly opening channel, which supports the floor 27 of the body 25. The channel 26 of the car has at the lower edge of the inner flange a laterally extending flange 28 terminating in a downwardly projecting flange 29, as shown for example in Figures 5 and 6.

The side of the body 25 at its lower edge has an inwardly projecting flange 30 standing just below the outer flange of the channel frame member 26.

The Ford car has a transverse, downwardly opening channel member 32, the ends of which stand just below the channel member 26, as illustrated for instance in Figure 5.

The support 21 extends forwardly just underneath the channel frame member 26.

The floor 27 and the channel frame member 26 are fastened together by means of a bolt 24, shown for instance in Figures 3 and 6.

In installing my device, the nut on the lower end of the bolt 24 is taken off to permit the bolt 24 to be inserted through the hole 23 and the nut is then replaced.

Forwardly of the bolt 24, there is a wooden filler block 26ª in the channel frame member 26. A bolt 33 secures the floor 27, the channel 26, the filler block 26ª and the channel 32 together, as shown for example in Figure 5.

In installing my device, the nut on the lower end of the bolt 33 is removed so that the bolt 33 may be inserted through the forward hole 35 of the support 21 and thereupon the nut is replaced.

I have indicated the nuts on the bolts 24 and 33 by the characters 24ª and 33ª.

In the installation of the member 21, the slot 34 receives the rearward flange of the channel 32 and the forward end of the member 21 is arranged in position substantially abutting against the forward flange of the channel 32.

It happens with the Ford car now being made that with such an installation the upper horizontal flange of the support 21 fits snugly against the central portion of the channel 32, where the member 21 is attached by means of the bolt 33 and also against the flange 28 of the longitudinal channel member 26 where the member 21 is attached by means of the bolt 24.

It will thus be seen that my improved structure as above explained takes advantage of the structure of the Ford car for getting a rigid fastening of the member 21 to the car by means of the ordinary body bolts.

The insertion of the flange of the channel 32 into the slot 34 and the abutting of the forward end of the member 21 against the other flange of the channel 32 helps to hold the bumper structure against twisting and sidewise vibrations and blows.

For the purpose of further providing a rigid unit, I have provided a brace indicated generally by the reference character B, which comprises a member 36 having at its rear end an eye 37 receiving the inner bolt 17 between the eyes 14 and provided with an extension 37ª rigidly connected with the inner end of the T iron member 15.

The portion 36 of the brace B is inclined from the inner bolt 17 forwardly and laterally to the vertical flange of the member 21 just underneath the horizontal flange thereof, as shown in Figure 3.

The brace B has a portion 38 extending rearwardly along the vertical flange of the member 21 and bolted and riveted thereto as at 39 and having at its forward end a portion 40 extending laterally from the member 21, as shown in Figure 2.

The body 25 has the back 41.

Below the rear part of the body is a downwardly opening channel member 42 having at the lower edge of its forward flange a forwardly projecting flange 43, and at the lower end of its rearward flange a similar rearwardly projecting flange 44 terminating in a downward flange 45 around which the lower edge of the back 41 is crimped.

The portion 40 of the brace B projects laterally inwardly beneath the flange 43 of the channel 42 and has at its inner end an angle bracket 46 with its vertical flange fastened to the portion 40 and with its horizontal flange extending rearwardly and standing beneath the channel 42.

A bolt 47 is extended through the channel 42 and the horizontal flange of the bracket 46 for fastening these members together and has the nut 48 on its lower end.

The brace B in combination with the other parts of the device affords a structure of great rigidity.

The bumper elements proper are supported on the member 21 against twisting movement and the unitary brace B likewise being supported on the body of the car contributes to making a unitary structure rigidly braced against strains in all directions.

The brace B also takes advantage of the structure of the automobile. The brace B fastened to the upright flange of the member 21 and extending underneath the horizontal flange thereof uses both flanges of the member 21 for resisting twisting strains.

I have provided one other feature which contributes to the effectiveness of the whole device.

A fender brace C is made of a heavy piece of strap iron, having at its inner end the substantially flat portion 49 fastened as at 50 to the under side of the horizontal flange of the member 21. The strap iron then comprises a portion 51 extending downwardly and laterally outwardly around the vertical flange of the member 21 and at its outer end having a portion 52 projecting rearwardly and adapted to fit against one of the flanges at the side of the fender 11.

A curved portion 53 extends laterally from the portion 52 and terminates in a forwardly extending portion 54 adapted to fit against the inside of the outer flange of the fender 11, all as shown in Figures 2 and 4. The members 52 and 54 are fastened to the fender flanges by means of bolts 55 or the like.

This fender brace helps to connect the bumper to the body and to connect the fender to the bumper and the body in one unitary structure in which all of the parts tend to resist blows imposed upon any of the parts and to resist any tendency of the parts to separate due to vibration or the like.

In my claims, I have sometimes referred to the members A as bumper elements and to the members A and 15 as a bumper.

Referring now more in detail to the advantages just mentioned, it will be observed that my bumper structure is particularly adapted for mounting on a car having longitudinal and transverse frame members.

I have provided a bumper support 21 fastened to the longitudinal frame member and braced on the transverse frame member of the car.

It will thus be noted that any lateral blow or strain on the bumper is not only resisted by the direct fastening of the member 21 to the longitudinal frame member of the car but is likewise resisted by the transverse frame member of the car to which the strain is transmitted substantially in the line of the axis of such frame member. This I consider to be an important advantage and feature of structure.

It is also obvious from the description of the device that the fastening of the bumper support 21 forwardly of the transverse frame member to which it is braced and the bracing of the bumper support 21 to the transverse frame member rearwardly of the points where the support is fastened to the longitudinal frame member makes a very strong connection, the rigidity and strength of which are accentuated by the fact that the horizontal flange of the bumper support is fastened to one frame member and the vertical support to another, so as to utilize the full strength of the bumper support.

Another important feature of the structure of my device arises from the fact that the bumper comprising the member A and the member 15 is pivoted as at 22 to the support 21 and is braced by means of the brace B to the support 21 and also to the transverse frame member of the car.

It thus follows that if the outer end of the bumper should be struck by a car approaching from behind, the tendency of the member 15 to rotate at 22 is resisted by the brace B and through the portions 38 and 40 by the transverse frame member of the car.

It will, of course, be understood that some changes may be made in the details of the structure of my device, and it is not my intention to limit myself to details of structure, and it is my purpose to cover my invention as broadly as its actual scope will permit.

I claim:

1. In a device of the class described, the combination of a car body having longitudinal and transverse frame members with a spring bumper and a bumper support connected with said bumper and supported on a longitudinal frame member, a brace connected with the bumper at a point spaced from the point of connection of the support with the bumper, and connected with a transverse frame member.

2. In a device of the class described, the combination of a car body having longitudinal and transverse frame members, a bumper support secured to a longitudinal frame member with a brace extending from said support and secured to a transverse frame member at a point spaced from the last-named longitudinal frame member.

3. In a device of the class described, the combination of a car body having longitudinal and transverse frame members with a bumper support fastened to a longitudinal frame member and a brace secured to said support at a point spaced from the point of attachment between the support and the longitudinal frame member and secured to a transverse frame member at a point spaced from the last-named longitudinal frame member.

4. In a device of the class described, the combination of a body having a longitudinal frame member and a transverse frame member having a vertical flange with a bumper support having a horizontal flange provided with a slot to receive the flange of said transverse member, and means for fastening said bumper support to said longitudinal frame member on both sides of said slot.

5. In a device of the class described, the combination of a body having a longitudinal frame member and transverse frame member, having a vertical flange with a bumper support having a horizontal flange provided with a slot to receive the flange of one of said transverse members, means for fastening said bumper support to said longitudinal frame member on both sides of said slot, and a brace secured to said bumper support at a point spaced longitudinally thereon from said last-described means and secured to a transverse frame member at a point spaced from said longitudinal frame member.

6. In a device of the class described, the combination of a car body having a longitudinal and a transverse frame member with a curved spring bumper element, a rigid connecting member connected with the ends of the bumper element, a rigid support secured to the connecting member and to the longitudinal frame member, and a brace connected with the support at a point spaced from the point of connection between the rigid member and the support and connected with the transverse frame member.

7. In a device of the class described, the combination of a car body having a longitudinal and a transverse frame member, with a bumper support arranged in a plane substantially parallel with the longitudinal frame member and fastened to the longitudinal frame member, a bumper pivoted at a point spaced laterally from its ends to said bumper support, a brace member secured to one end of said bumper and secured to said support at a point spaced from such pivotal connection, and a brace support connecting said bumper member with a transverse frame member at a point on the latter spaced from said longitudinal member.

8. In a device of the class described, the combination of a car body having a longitudinal and a transverse frame member, with a bumper support arranged in a plane substantially parallel with the longitudinal frame member and fastened to the longitudinal frame member, a bumper pivoted at a point spaced laterally from its ends to said bumper support, a brace member secured to one end of said bumper and secured to said support at a point spaced from such pivotal connection, and a brace member connecting said bumper support with a transverse frame member at a point on the latter spaced from said longitudinal member, said brace members being integrally connected.

9. In a device of the class described, a car body having a longitudinal and a transverse frame member with a pair of vertically, spaced, curved spring bumper elements, a rigid connecting member having its ends connected with the ends of the respective spring bumper elements between said elements, a rigid bumper support secured to said rigid member and to said longitudinal frame member, and a brace secured to said rigid support at a point spaced apart from the point of connection between the rigid connecting member and the bumper support and connected with the transverse frame member.

10. In a device of the class described, a bumper support, a bumper pivoted thereto at a point spaced laterally from its end, and a brace fixed to said support and fixed to said bumper at a point spaced from such pivot, and a fender brace secured to said support and adapted to be secured to a fender on the opposite side of the support from said first-named brace.

11. In a device of the class described, a pair of vertically spaced curved spring bumper elements having at their ends aligned pairs of eyes, a rigid connecting member having at one end an eye between the adjacent eyes of said bumper elements, a bolt extending through the eye of said connecting member and the adjacent eyes of the bumper elements, a bolt extending through the other eyes of said bumper elements, a support secured to said rigid member and projecting away therefrom substantially at right angles thereto, and a brace secured to said last-named bolt and to said rigid member and secured to said support at a point thereon spaced from said connecting member.

12. In a device of the class described, a pair of vertically spaced curved spring bumper elements having at their ends aligned pairs of eyes, a rigid connecting member having at one end an eye between the adjacent eyes of said bumper elements, a bolt extending through the eye of said connecting member and the adjacent eyes of the bumper elements, a bolt extending through the other eyes of said bumper elements, a support secured to said rigid member and projecting away therefrom substantially at right angles thereto, a brace secured to said last-named bolt and to said rigid member and secured to said support at a point thereon spaced from said connecting member, and a fender brace secured to said support and extending away therefrom on the opposite side thereof from said first brace and adapted to be secured to a fender.

13. In a device of the class described, the combination of a car structure having a longitudinal and a transverse frame member and fenders with a bumper support secured to said longitudinal frame member, a bumper secured between its ends to one end of said support, a brace connecting said support and such transverse frame member at a point spaced from the longitudinal frame member, and a fender brace secured to said support and extending away therefrom on the side opposite said brace and secured to a fender.

14. In a device of the class described, the combination of a car structure having a longitudinal and a transverse frame member and fenders with a bumper support secured to said longitudinal frame member, a bumper secured between its ends to one end of said support, a brace secured to said bumper at a point spaced from said support and extended diagonally to and secured to said support and extending thence to and connected with said transverse frame member at a point spaced from said longitudinal frame member, and a fender brace secured to said support and extended away therefrom on the side of the support opposite said brace and secured to a fender.

15. The combination with an automobile body having longitudinal and transverse frame members and fenders, with a bumper support fixed to the automobile body and extending rearwardly therefrom, a bumper element secured to the rear end of said support and arranged transversely thereof in the rear of the fender, a second connection between the bumper element and the support for bracing the latter relative to the support and a brace connected to the support and extending inwardly therefrom and secured to the transverse frame member at a point spaced from the connection of the support with the automobile body.

16. The combination with an automobile body having a frame including a transverse channel shaped member with a bumper support arranged at right angles to said transverse member and extending rearwardly therefrom, a portion on said support extending into the channel shaped frame member and secured thereto, a brace extending from said support and secured to the frame member at a point spaced transversely from the support and a bumper element connected to the rear end of said support by two substantially spaced connections for bracing the bumper element relative to the support.

17. The combination with an automobile body having a frame including a transverse channel shaped member with a bumper support arranged at right angles to said transverse member and extending rearwardly therefrom, a portion on said support extending into the channel shaped frame member and secured thereto, a brace extending from said support and secured to the frame member at a point spaced transversely from the support and a bumper element connected to the rear end of said support.

Des Moines, Iowa, October 23, 1925.

ALGOT W. NORDGREN.